(12) United States Patent
Kopko

(10) Patent No.: US 6,513,339 B1
(45) Date of Patent: Feb. 4, 2003

(54) SOLAR AIR CONDITIONER

(75) Inventor: William Leslie Kopko, Springfield, VA (US)

(73) Assignee: Work Smart Energy Enterprises, Inc., Washington, DC (US)

( * ) Notice: Subject to any disclaimer, the term of this patent is extended or adjusted under 35 U.S.C. 154(b) by 0 days.

(21) Appl. No.: 09/549,329

(22) Filed: Apr. 14, 2000

Related U.S. Application Data
(60) Provisional application No. 60/129,552, filed on Apr. 16, 1999.

(51) Int. Cl.[7] ............................................... F25D 17/06
(52) U.S. Cl. .............................. 62/94; 62/271; 62/235.1
(58) Field of Search ........................... 62/271, 94, 235.1

(56) References Cited

U.S. PATENT DOCUMENTS

| | | | | |
|---|---|---|---|---|
| 4,081,024 A | * | 3/1978 | Rush et al. .................... | 165/62 |
| 4,121,428 A | * | 10/1978 | Glenn et al. ...................... | 62/2 |
| 4,180,126 A | * | 12/1979 | Rush et al. .................... | 165/59 |
| 4,222,244 A | * | 9/1980 | Meckler ........................... | 62/2 |
| 5,758,511 A | * | 6/1998 | Yoho et al. .................... | 62/271 |

* cited by examiner

Primary Examiner—William C. Doerrler
Assistant Examiner—Mark Shulman

(57) ABSTRACT

An air conditioning system that can be driven by solar energy. A solar collector used energy from the sun to evaporate water from a desiccant fluid. The desiccant fluid is then flows into a mass transfer device which removes moisture from an air stream. Calcium chloride is the preferred desiccant material and can serve as an energy-storage medium. Electric or fuel backup can be used with this system to regenerate the desiccant material. In some embodiments an indirect evaporative cooler is added to provide sensible cooling. A new desiccant cooling system that is specially designed to work with the properties of this desiccant and meet comfort requirements of conventional air conditioning.

30 Claims, 15 Drawing Sheets

SOLAR AIR CONDITIONER

CROSS-REFERENCE TO RELATED APPLICATIONS

The applicant claims benefit of U.S. provisional application No. 60/129552 filed on Apr. 16, 1999.

FIELD OF THE INVENTION

This invention is in the field of air conditioning, specifically thermally driven air-conditioners that are capable of accepting a solar input.

BACKGROUND OF THE INVENTION

Solar air conditioning has great potential to reduce energy use from air conditioning. Sunlight is most plentiful in the summer when air conditioning is required.

The problem is that existing solar technologies have not produced systems that are economically competitive with conventional electrically driven systems. Prior work with solar air conditioning has not produced practical systems. Solar air conditioning systems have used two basic approaches in an attempt to capture the sun's energy for cooling—thermal and photovoltaic.

The photovoltaic systems use photovoltaic panels to convert solar radiation directly into DC electricity. Photovoltaic systems have two major advantageous attributes: they can use conventional electrically driven air-conditioning equipment which is widely available and inexpensive with the addition of the solar panels that use an inverter to produce AC power, and they can use the utility grid for backup power during dark or cloudy periods.

Unfortunately there are other attributes: the high cost of manufacturing, the low conversion efficiencies, and the need for a continual stream of photons to produce power, create three major disadvantages. First electricity from solar cells is very expensive because of the high cost of the solar panels. (Panels for a residential air conditioner can cost well over $10,000.) Second the space needed for powering the air conditioning units is large. And third the panels provide no energy storage, which creates a need for use of grid based electricity at night and on cloudy day. In fact, the peak output from the solar panels occurs around solar noon, while peak air-conditioning load occurs several hours later, resulting in a significant mismatch between supply of needed power and demand. This mismatch greatly reduces the value of the system in reducing peak power demand to the utility, demands which recently deregulated markets is demonstrating are much more expensive to meet than had heretofore been obvious. For off-grid locations, the only viable energy storage system to match the provision of power to times when demand is high (later in afternoon and at night) is batteries. Batteries have a high first cost, require periodic replacement, and normally use toxic and/or corrosive materials. These problems have prevented the use of photovoltaic systems in other than a few high-cost demonstration systems.

Thermal systems use heat from the sun to drive an air conditioner. Typical approaches use a high-temperature flat-plate collector to supply heat to an absorption system. Systems with concentrating collectors and steam turbines have also been proposed. Natural gas or other fuel is used for backup heat. While thermal systems have the advantage of eliminating the need for expensive photovoltaic panels, they have attributes that produce major disadvantages.

One problem is the high cost and large size of the solar collectors. Flat-plate collectors running at about 190° F. (90° C.) require double-glazing and selective surface to achieve reasonable efficiency levels, which greatly increases the collector cost. This high collector cost reduces the comparative attractiveness of such systems to standard vapor compression systems driven by grid electricity. Large collector size also reduces the potential market size by eliminating many locations from possible use of the systems.

Furthermore, existing thermal technologies also suffer from the poor COP of absorption systems, typically around 0.5. When combined with a typical collector efficiency of 20 to 50%, this inefficiency, besides creating a need for large collector areas, makes the whole system much less economically and environmentally attractive.

Another important problem introduced by the performance attributes of current solar thermal air-conditioning concepts is the high-cost and large size of high-temperature thermal storage. Large thermal storage is required to reduce backup energy (typically gas) that would be used much of the time when their was a mismatch between demand for cooling and solar inputs. This mismatch is the discrepancy between high solar input at noon and large demands for cooling during late afternoon, at night, and on cloudy days. A related problem with existing concepts for thermally driven solar cooling is the need for significant power input for circulating pumps and fans, which further reduces the possible energy savings.

Together these attributes for current concepts for thermally driven solar cooling imply that the large majority of their energy input would come from the backup fuel and electrical input for fans and pumps. In essence, these various problems mean that these solar systems are effectively very expensive gas-driven systems.

No commercially available or conceptually proposed system has been demonstrated that has the attributes that would be needed for commercially viable solar air conditioner. Commercial success will require the system to have the following attributes: low first cost (The market tends to be first cost driven so it is critical that the cost and thus ultimate selling price not be too high.); small collector area (critical to cost and to finding many locations in which installation is practical); small storage size (The mismatch between solar supply and cooling demand requires storage if the system is not to become a glorified means for using fossil energy and if it is to be practical to install in many locations—as well as low cost to manufacture.); easy to incorporate backup capability (Regardless of storage capacity, the ability of the system to meet demand in extreme and unusual circumstances will be critical to market acceptance; customers demand perfection and then some.).

Evaporative coolers are a related technology with a long history. Direct evaporative coolers are the simplest and most common. They consist of a means for moving air over a wet pad. Water evaporates from the pad and thereby cools and humidifies the air. They are commonly used for comfort cooling in warm, dry climates such as those found in the southwest U.S.

Indirect evaporative coolers are more sophisticated. An indirect evaporative cooler means that air is cooled by contact with a dry surface that is in turn cooled evaporatively.

Desiccant systems dry air for air-conditioning purposes. A typical system uses a solid desiccant impregnated on a wheel of corrugated metal or plastic.

Some more obscure systems appear in the patent literature, but each has its own problems. U.S. Pat. Nos. RE 20,469; 4,660,390; 4,854,129 describe regenerative indirect evaporative coolers that use a portion of the air exiting the dry cooler as inlet air to the wet side. U.S. Pat. No. RE 20,469 describes a cumbersome arrangement of coils and cooling towers this complicated and expensive. U.S. Pat. No. 4,660,390 describes another system that uses tubes in a crossflow configuration to transfer heat between a wet side and a dry side. U.S. Pat. No. 4,854,129 also uses a system that uses a cooling coil with water from a cooling tower.

U.S. Pat. No. 5,050,391 describes another option for the desiccant system. This system uses solid desiccant material and a true counterflow arrangement for the heat exchangers. It also has essentially a single stage of cooling which limits it performance and its ability to use inexpensive desiccant materials.

DESCRIPTION OF THE INVENTION

Description a Preferred Embodiment

Figure 1:
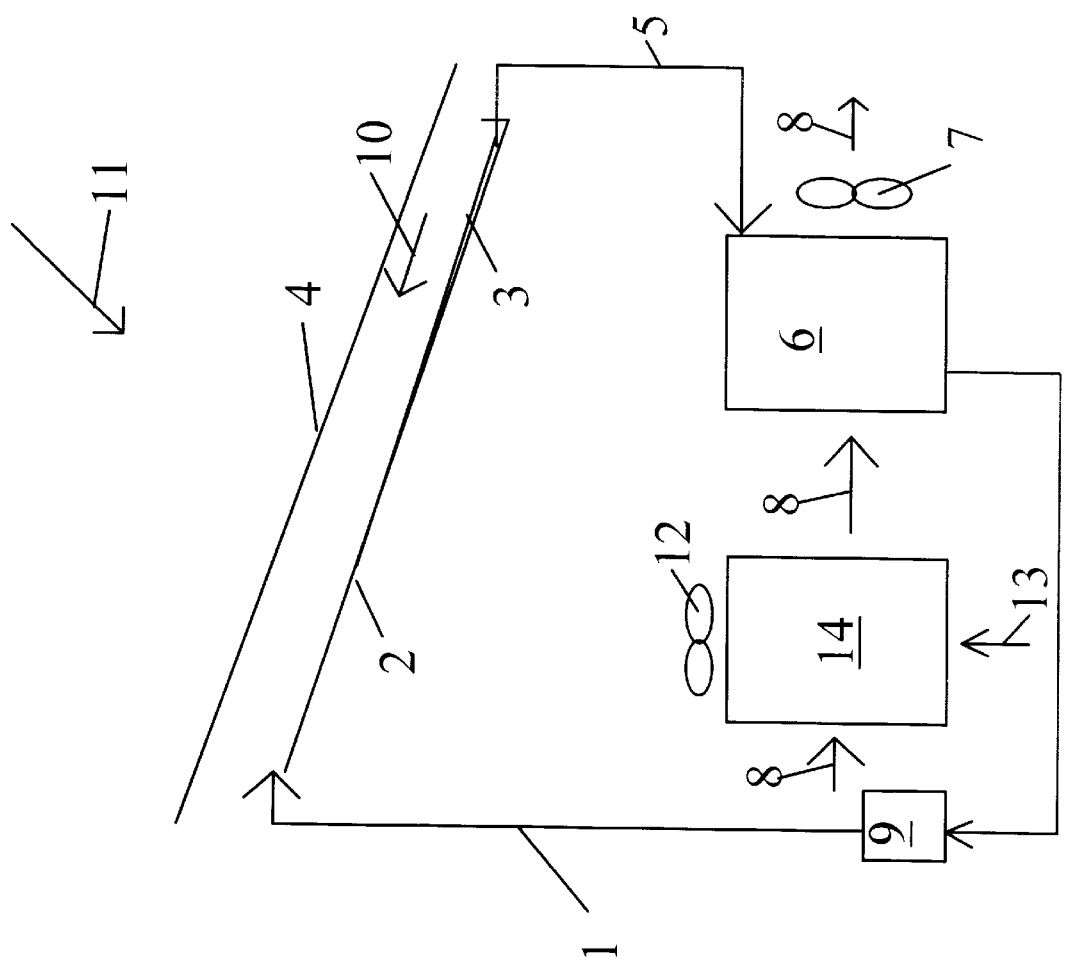
FIG. 1 shows a basic preferred embodiment of the invention.

FIG. 1 shows a preferred embodiment of the invention. A flow of desiccant fluid 1 is pumped by pump 9 to a solar collector 15 that acts as a regenerator for the desiccant fluid. The fluid trickles over a collector surface 2 in the form of a thin sheet 3. A cover 4 transmits solar radiation 11, which warms the desiccant fluid as it flows over the collector surface. A flow of air 10 removes water vapor that evaporates from the desiccant fluid. The concentrated desiccant 5 leaves the collector and flows to a mass-transfer device 6 that allows the desiccant to absorb moisture from an air stream 8. The mass-transfer device is preferably a direct-contact exchanger similar to those used for direct evaporative coolers and may also include a pump for recirculating the desiccant liquid through the device to ensure good mass transfer. A supply air fan 8 moves the moves the air stream through the mass-transfer device.

An indirect evaporative cooler 14, cools the air stream 8 without adding moisture to it. A fan 12 draws a secondary air stream 13 through the cooler. The secondary air stream may be exhaust air from a building, ambient air, or a portion of the conditioned air leaving the evaporative cooler or mass-transfer device. This indirect evaporative cooler is optional and may be eliminated in cases where no sensible cooling is required.

Indirect Evaporative Cooler Design

Figure 2:
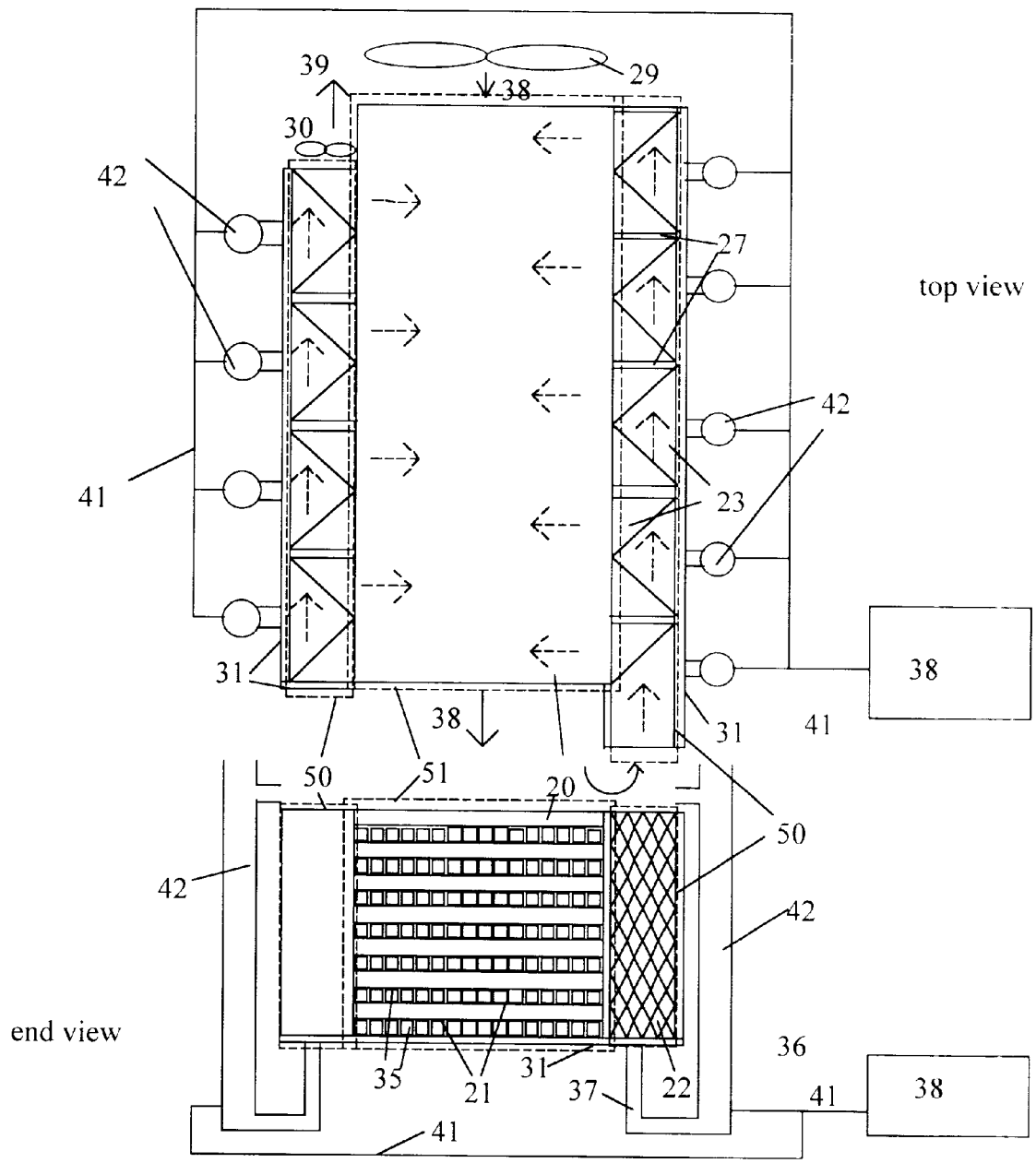
FIG. 2 shows a design of an indirect evaporative cooler used in this invention.

FIG. 2 shows the one heat exchanger system that is suitable for use as an indirect evaporative cooler for this system. The cooler has two basic parts—mass transfer means 50 and an air-to-air heat exchanger 51. The cooler is shown without a top cover for clarity. Corrugated panels 20 for secondary air are oriented so that corrugations run from side to side while corrugated panels 21 for primary air have corrugations that run from end to end. Channels 35 formed by the corrugations in panels 21 allow for free flow of air through the panels. Likewise similar channels run in a perpendicular direction through panels 20. The panels 20 are stacked alternately with panels 21 so that the channels for each panel are perpendicular to the channels for the adjacent panels. The outside surface of the sheets may be covered with an adhesive or filler material to ensure good contact between the sheets. For maximum durability the panels are preferably made of polypropylene or polyethylene plastic. Metals, such as aluminum, are also possible materials.

Another option is to use corrugated cardboard and paper. Waterproof adhesive material, such as one based on acrylic or linseed oil, can coat the paper or cardboard and joins the layers together to form a single unit. The advantage of cardboard or paper is its very low cost. The disadvantage is that it is may be less durable. One advantage of this system is that it is not possible to create condensation within the heat exchanger, which allows the possible use of cardboard in some applications. This is especially true in desiccant applications since it is possible to keep both air streams above their respective dew point temperatures even when outdoor conditions are at 100% relative humidity (such as rain or fog conditions).

The main fan 29 moves primary air stream 38 through a single pass through channels 35. The stacked panels 20 and 21 form a heat exchanger that cools the primary air without addition of humidity. A portion of the cooled primary air splits off and forms a secondary air stream 39 which is moved by secondary fan 30. The secondary air first flows through multiple passes of the air-to-air heat exchanger to cool the primary air stream. The direction of the secondary air flow through the heat exchanger is shown by the dashed arrows.

The passes of the secondary air stream are preferably arranged in a counter crossbow configuration with a mass transfer means ahead of each pass of the heat exchanger. The mass transfer means is preferably a direct evaporative cooler. The direct evaporative cooling sections 23 form U-bends that direct the secondary air through each pass. As shown in the figure three triangular pieces fit together to form two mitered elbows which make each U-bend. Pass dividers 27 would normally be included to prevent excessive leakage between passes in the wet media in each pass. Housing 31 ensures that excessive air does not leak in or out of the heat exchanger.

The chief use of this system is as an evaporative air cooler, but many other applications are possible. In addition to air, this system can work equally well with any number of nonreactive gasses such as nitrogen, carbon dioxide, inert gasses, etc. This system can also be used as a heater. For example if a desiccant liquid is substituted for water and the entering gas stream has a high relative humidity, the system would act to heat the gas stream. Volatile liquids other than water-based solutions can be used in the system, but they are very expensive and may pose risks with flammability or toxicity.

The direct evaporative cooling sections need to be thoroughly wetted to ensure good evaporation while minimizing mineral deposits. In addition there is normally a large change in the wet-bulb temperature from one end of the heat exchanger to the other, so that water circulation between passes needs to be minimized to reduce undesirable heat exchange. These factors make it desirable to use multiple water circuits with multiple pumps.

For large systems using multiple pumps does not introduce a significant cost penalty, but for small systems multiple pumps can add greatly to the cost. One possible solution is to have multiple pumps that share a common shaft and motor. Seals separate the pumps from each other to minimize leakage and heat transfer.

FIG. 2 shows another possible option for circulating liquid using air-lift pumps 42. Air pump 38 supplies pressurized air through air line 36. Drain 37 removes water from the bottom of the direct evaporative cooling sections 23. Air bubbles into the water to create a pumping action. Extra water can be supplied to the pumps to make up for that lost to evaporation or blow down.

Other configurations of the air-to-air heat exchanger are possible. For example instead of stacking corrugated panels on top of each other, it may be possible on use spacers between the panels that are oriented in the same direction. The spacer could separate the passes of the secondary air and allow free flow of the secondary air over the panels. In this configuration the primary air would flow inside the channels of the panels. This alternative configuration should reduce material cost and reduces thermal resistance of the walls between the two air streams.

Another configuration would simply stack sheets with spacers to direct air flow. For example sheets of paper can be separated by corrugated cardboard spacers. The spacers would be on the order of 0.1 inches thick to form a flow channel for air. The orientation of the spacers would alternate so that the air flow for the secondary air is perpendicular to the that for the primary air. This arrangement would use a minimum amount of material and is a simple design and would be the preferred configuration for materials, such as paper, that are easily glued together.

Indirect Cooler Theory of Operation

Figure 3:
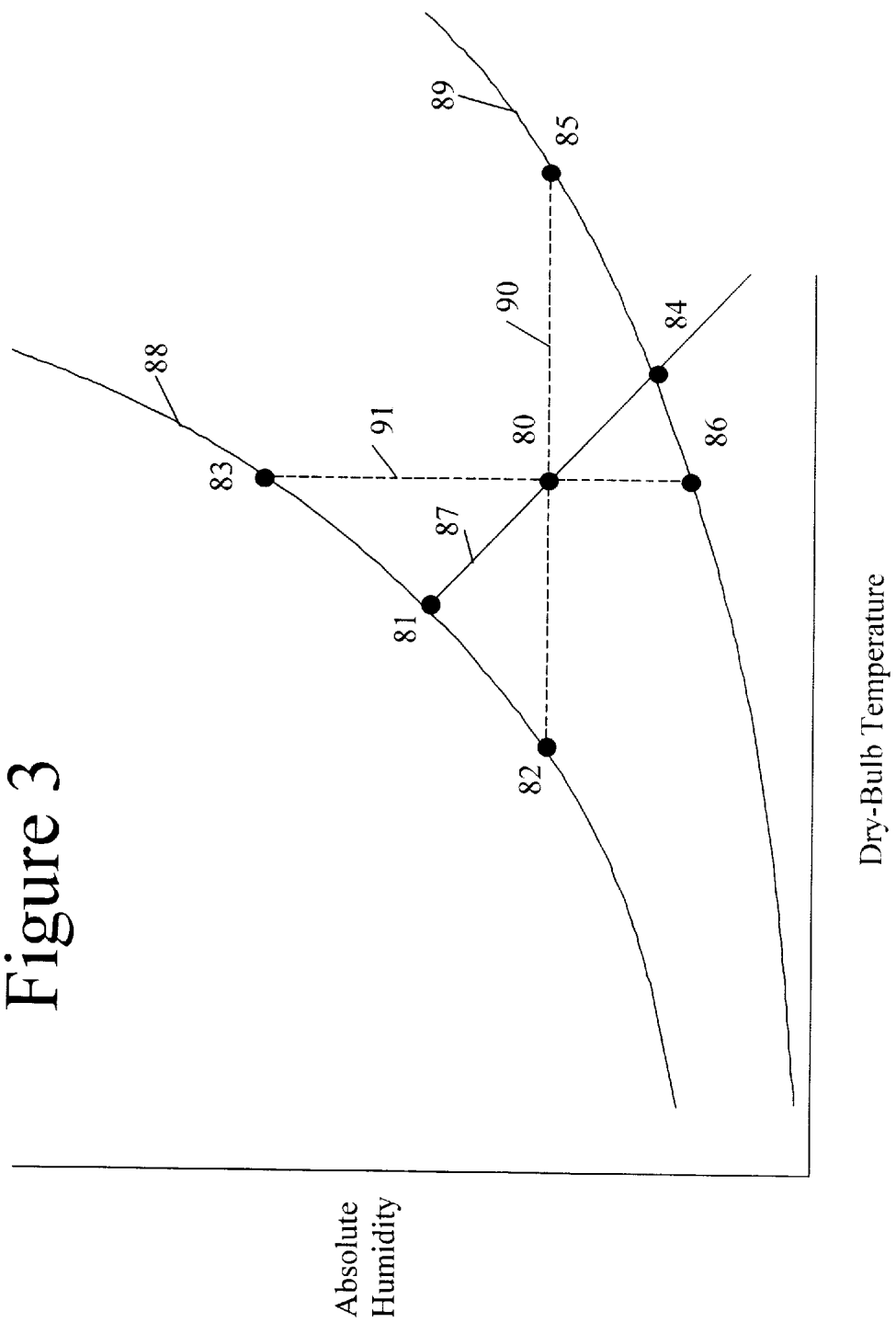
FIG. 3 is a schematic psychrometric chart that shows how this cooler works.

FIG. 3 is a psychrometric diagram showing how the idealized behavior of the system. For the case of conventional direct evaporative cooler, the process start at entering air 80 and follow the constant wet-bulb temperature line 87 (which is also essentially a line of constant enthalpy) and approach ideal exit condition 81 which is along saturation curve 88. For the new system used as a cooler there are two exit conditions, the supply air 82 and exhaust air 83. The primary air stream follows the line of constant absolute humidity 90 and approaches the saturation condition at point 82. A portion of this air exits system as supply air and the rest moves along the saturation line 88 as it is heated and humidified until it approaches the ideal exhaust condition 83. This exhaust condition is ideally at the intersection of the saturation line 88 and the constant dry-bulb temperature line 91. The result is a colder supply air temperature than is possible with a simple direct evaporative cooler.

For the case of a heater, the conventional direct contact system would again follow constant wet-bulb line 87. The process would start at the entering air condition 80 and approach ideal equilibrium point 84, which is on the desiccant equilibrium curve 89. For the new system, there are again two ideal exit conditions, the supply air condition 85 and the exhaust condition 86. As with the cooler, the ideal supply air temperature is the point along the constant absolute humidity line 90 that is in equilibrium with the liquid. In both cases only a fraction of the primary air stream needs to be exhausted, typically 30 to 50%, which leaves the rest as supply air.

Air-Lift Pump

Figure 4:
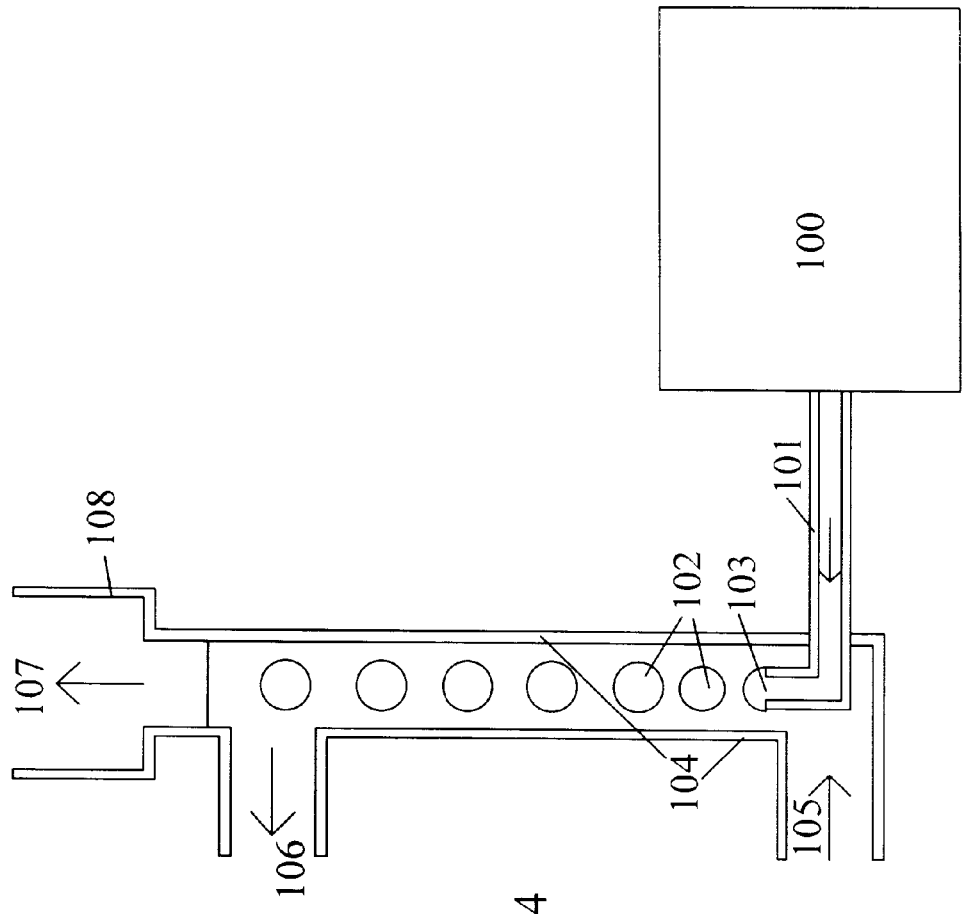
FIG. 4 is drawing of a simple air-lift pump that is preferred for use in the invention.

FIG. 4 shows detailed drawing of an air-lift pump that is suitable for pumping liquid desiccant and water. Air pump 100 supplies pressurized air 103 to air line 101. The air pump is preferably an aquarium pump or similar design. The air line 101 discharges inside water pipe 104 and creates a flow of air bubbles 102. The bubbles lower the average density of the fluid column which causes the air and water mixture to move upward. This upward movement draws intake water 105. On the top end a separator 108 allows outlet air 107 and outlet water 106 to discharge from the pump in separate flows. The advantages of this pump include low cost, simple design, reliability, no moving parts. This pump is excellent for handling small liquid flows with a small head requirement. A single air pump can drive many air-lift pumps an thus create many liquid circuits.

Evaporative-Desiccant Heat Exchanger

Figure 5:
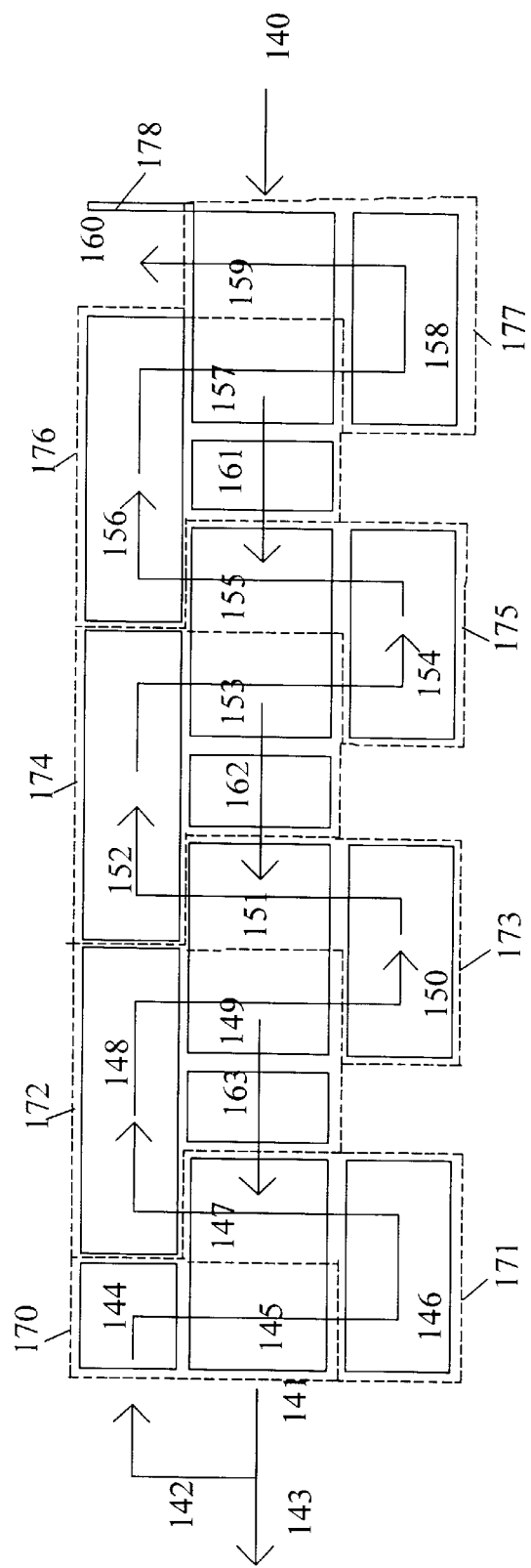
FIG. 5 shows a diagram of a combination evaporative-desiccant cooler that is a component of this system.

FIG. 5 shows a heat exchanger that adds the use of a desiccant. This arrangement has eight stages of cooling, 170, 171, 172, 173, 174, 175, 176, and 177. The incoming primary air 140 enters the rightmost stage 177. It then flows through the eight stages in a straight path where it is cooled and dehumidified. The exiting primary air 141 splits into two flows. A secondary flow 142 goes back through the heat exchanger in a counter-crossflow arrangement. The remaining primary air 143 is supplied to the load.

As shown in this figure each stage of cooling includes an evaporative pad for cooling and humidifying the secondary air and an air-to-air heat exchanger that transfers heat between the two air streams. In addition some of the stages include desiccant, which dries the primary air stream. The desiccant is preferably a liquid, such as an aqueous solution of calcium chloride, lithium chloride, lithium bromide, glycol, or similar material. Materials such as sodium hydroxide and sulfuric acid have excellent physical properties but are very corrosive and dangerous to handle. Calcium chloride is very inexpensive, has acceptable thermodynamic properties, has relatively low toxicity, and is generally the preferred desiccant material for this system.

Starting with the rightmost stage 177 secondary air flows over evaporative pad 158 and through air-to-air heat exchanger 159. The primary air flows through the other side of the air-to-air heat exchanger 159. The flow directions of the two air streams are perpendicular to each other with the primary air going is a straight line through the heat exchanger.

Next to the left is stage 176 which includes a desiccant 161 that is in the primary air stream. The desiccant is preferably provides a surface that is wetted by a liquid desiccant that is in direct contact with the primary air stream. The evaporative pad 56 cools and humidifies the secondary air stream. The secondary air stream cools the primary air stream in air-to-air heat exchanger 157.

The stages 170, 175, 173, and 171 are similar to stage 177 with evaporative pads 154, 150, 146, and 144 in the secondary air stream and air-to-air heat exchangers 155, 151, 147, and 145 transferring heat between the two air streams.

The stages 174 and 172 are similar to stage 176. They include desiccants 162 and 163 which dehumidify and increase the temperature of the primary air stream. The evaporative pads 148 and 152 cool and humidify the secondary air which cools the primary air in air-to-air heat exchangers 149 and 153.

Mist Cooling Option

Figure 6:
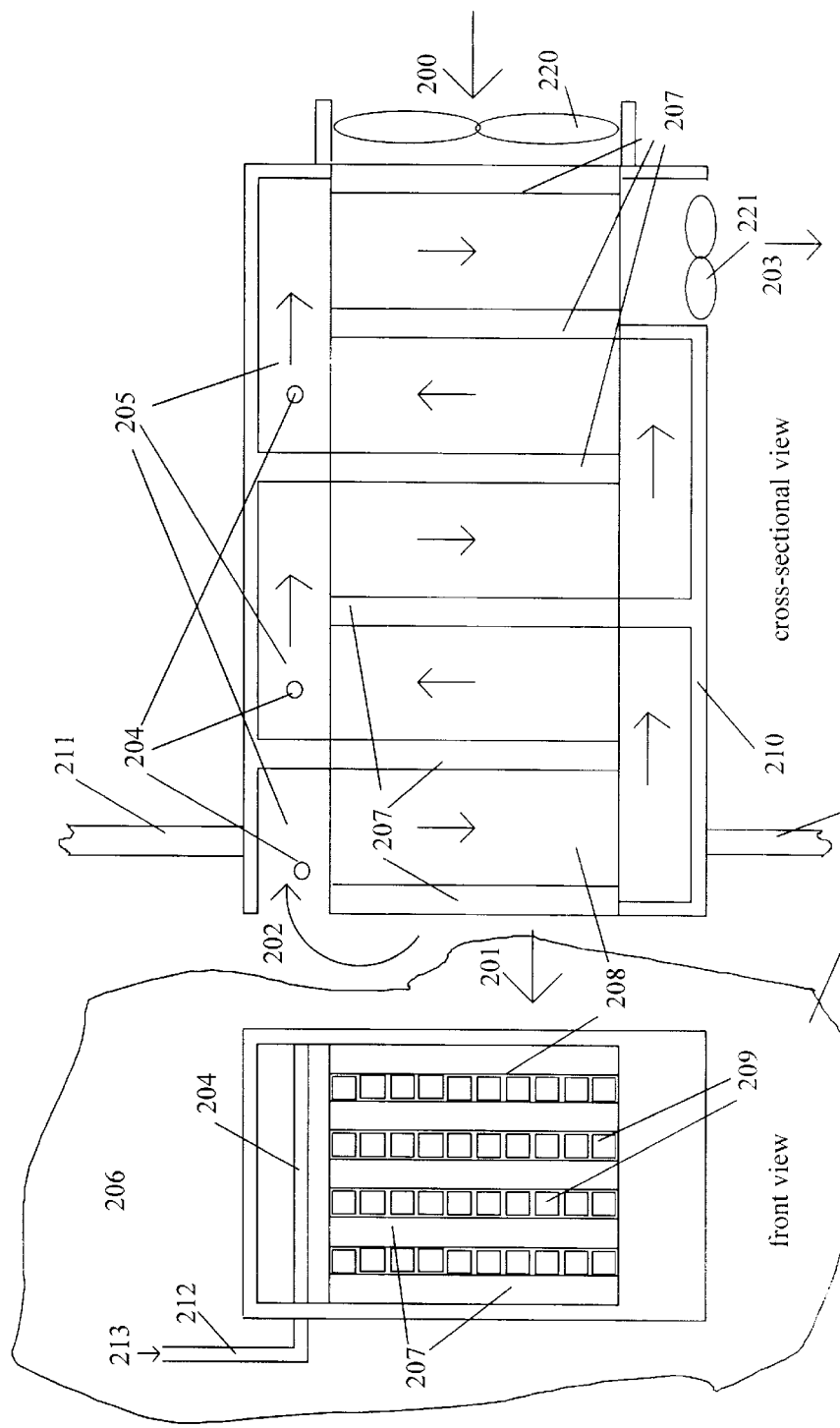
FIG. 6 shows another cooler configuration that uses a water mist for evaporative cooling.

FIG. 6 is another heat exchanger configuration that uses a mist cooling system. Fan 220 draws in the main air stream 200. The air moves in a straight line through interior channels 209 in panels 208 and is cooled by evaporating water mist 205 on the outside of panels 208. The mist is supplied by nozzles 204 that are connected by way of pipe 212 to a source of pressurized water 213. The water is preferably demineralized and filtered to prevent clogging and fouling of the nozzles and the heat exchanger surfaces. As the main air stream leaves the heat exchanger, a portion of the air forms a secondary air stream 202 which returns on the wet side of the heat exchanger. Dividers 207 direct the secondary air in multipass counter crossflow arrangement as shown by the arrows. Housing 210 and wall 211 prevent undesirable air leakage. Fan 221 moves the secondary air out of the heat exchanger in exhaust stream 203. Drains 222 may be included at the bottom of the housing to remove excess water.

Simple Solar Collector

Figure 7:
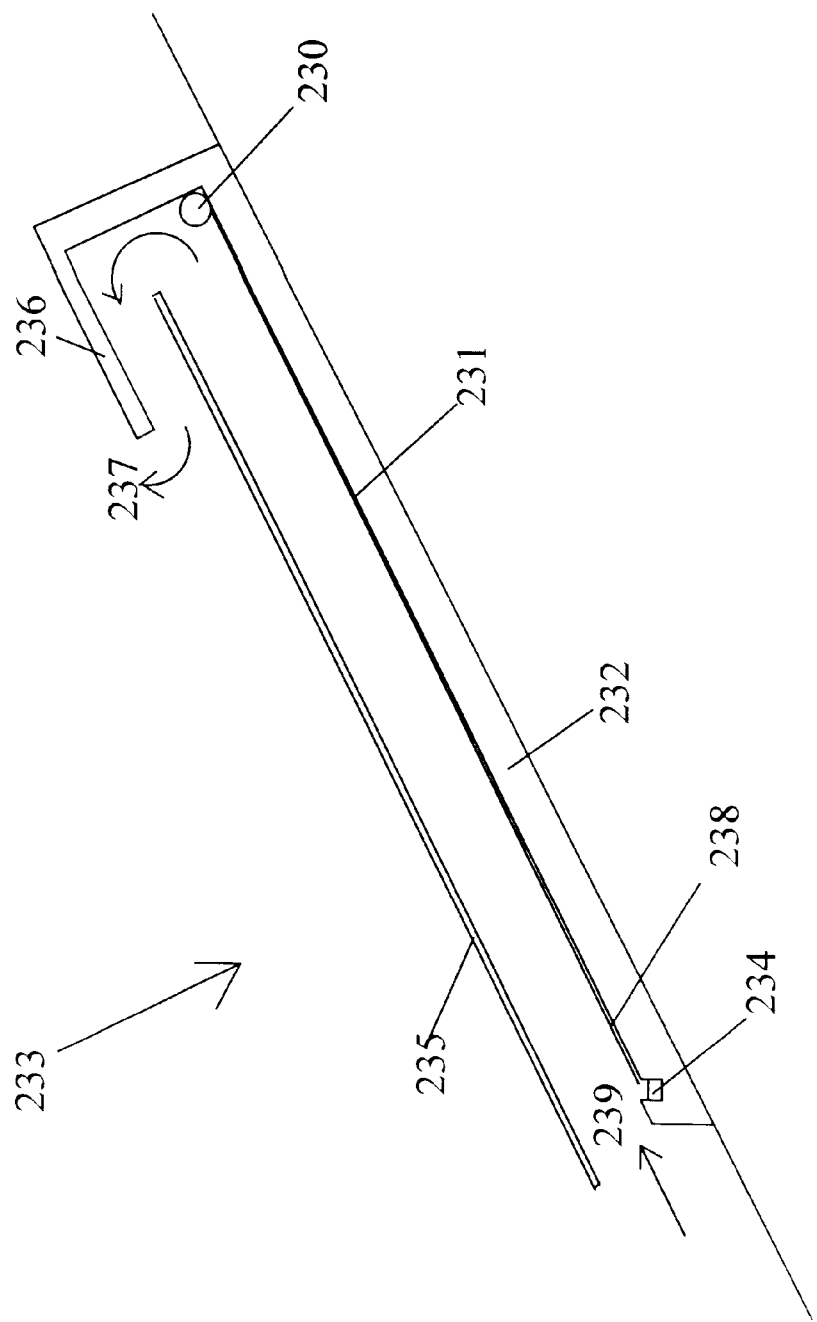
FIGS. 7, 8, and 9 shows solar collectors that may be used in the invention.

FIG. 7 is a simple solar collector for regenerating a desiccant solution. Liquid header, 230 trickles desiccant liquid 238 over collector surface 231 which is tilted at an angle to allow drainage through trough 234. Solar radiation 233 is transmitted through cover 235 and warms the desiccant liquid 238. The collector surface is preferably black and is backed by thermal insulation 232 to maximize energy collection.

The cover is preferably of a transparent material such as polycarbonate, polyvinyl chloride (pvc), fluoropolymers (such as Tedlar), acrylic, or other plastic. For rigid matericals, the cover may be flat or corrugated. Flexible films such as Tedlar would normally be held taught in a frame. Glass is another option for a cover material. The selection of optimum collector material depends on the cost and durability of the different materials. The duty is similar to that for greenhouses, windows, skylights, etc. with temperatures that are much lower than those for most other types of solar collectors.

Incoming air 239 flows by natural convection between the cover and the collector surface and absorbs moisture that evaporates from the desiccant liquid. The leaving air 237 exits the collector between end piece 236 and cover 235. The end piece is shaped so as to prevent rain from entering the collector.

The desiccant solution 238 preferably flows in a sheet that wets the entire collector surface. One way of achieving this flow is to use a screen, cloth, or other roughness on collector surface 231. Another option is to use a relatively large flow of liquid to create a continuous film of liquid. A third option is to add a detergent or other wetting agent to the solution to enhance wetting. Combinations of these three alternatives are also possible.

The orientation of the collector is preferably such that the rays of midday summer sun is approximately normal to the collector surface. For the most of the US this corresponds to a tilt of angle of 5 to 30 degrees from horizontal towards the south. In tropical areas the collector surface can be nearly horizontal with only a few degrees of tilt to allow adequate drainage. In the Southern Hemisphere the collector is preferably tilted to face north.

The operation of this collector is quite simple. When solar radiation is available to raise the collector surface to a temperature that is sufficiently high, desiccant liquid is allowed to flow through the collector. At other times no liquid would flow. A simple thermostat that controls the circulating pump can accomplish this control.

This collector has several advantages. First the temperatures necessary to regenerate the desiccant liquid are quite low, in the range of about 110 to 140 degrees Fahrenheit, which allows the use of inexpensive materials such as plastic, wood, asphalt roofing material, etc. Second the operation is very simple with no moving parts. Third the collector can be mounted on an existing roof or other surface.

While the preferred embodiment of the solar collector includes a cover, the collector would also function without a cover. The main advantages eliminating the cover are reduced cost and complexity. The collector can, in fact, be as simple as a section of dark roof or other surface with the addition of a system desiccant liquid over the surface. The chief problem with operation without a cover is that rain would tend to wash away any residual desiccant solution. The resulting diluted desiccant would have to be discarded or else it would dilute the solution in storage. Wind or leaves may also carry desiccant solution away when no cover is present. Loss of large quantities of desiccant solution is costly, may damage nearby plants or metals, and may create unsightly salt deposits on surrounding surfaces. A simple cover should greatly reduce or eliminate these problems, but it is not absolutely necessary for operation.

In dry climates an evaporation pond is an alternative to a solar collector. A pond is an inexpensive way of regenerating a desiccant solution. The chief problems are related to control over the salt concentration. An extended rainy period can dilute the solution excessively, while long periods of dry, sunny conditions can result in crystallization. Another issue is the possibility of high winds blowing droplets of desiccant solution onto surrounding surfaces which may create problems with corrosion, plant damage, etc.

Solar Still with Automatic Shut-Off Feature

Figure 8:
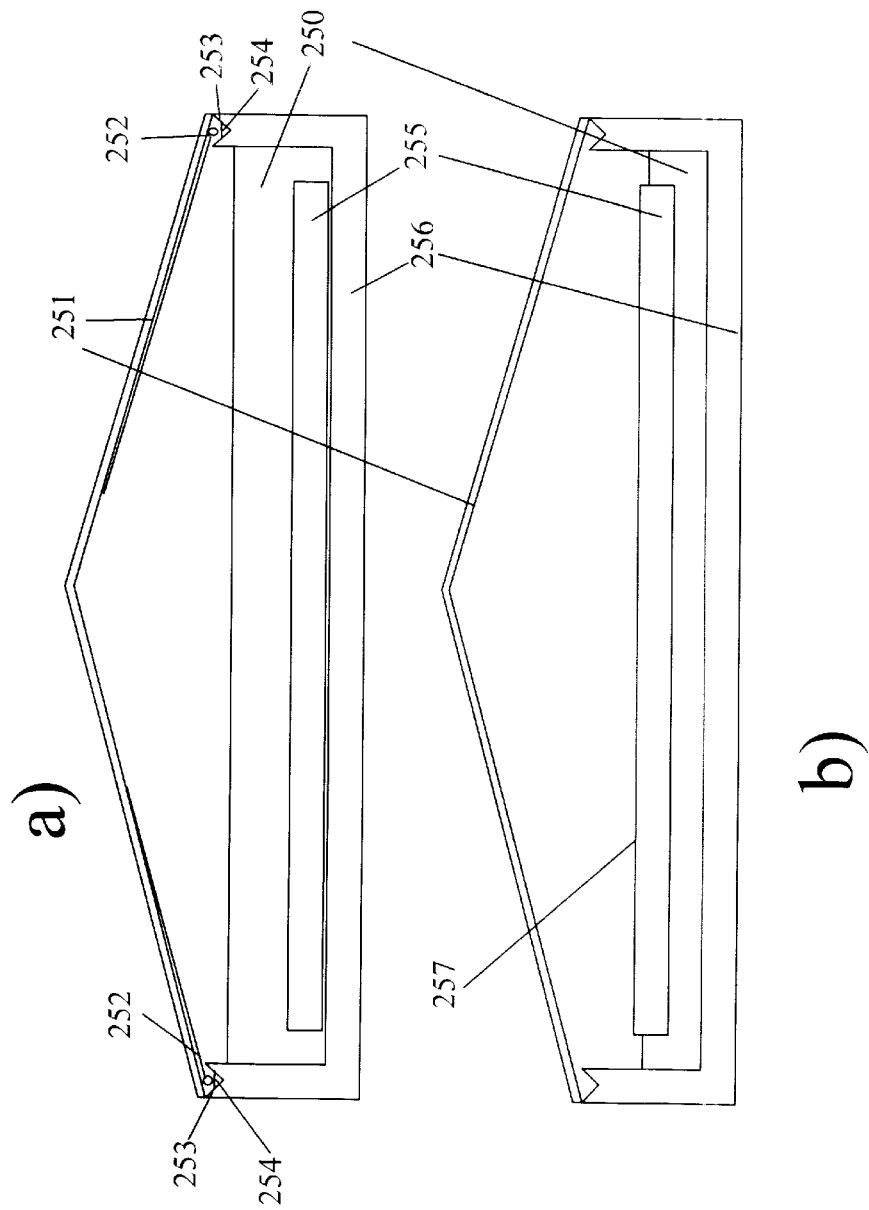

FIGS. 8a and 8b shows a solar still with an automatic shutdown feature that can regenerate the desiccant liquid. FIG. 8a shows the still in normal operation. Solar radiation 260 warms desiccant liquid 250. Water vapor evaporates from the desiccant liquid and form condensate 252 on cover 251. The condensate trickles down the inside of the cover and collects in troughs 253 and 254. An insulated tank 256 forms the bottom and the sides of the collector and holds the desiccant liquid.

Float 255 provides a simple control mechanism. As shown in 7a, the desiccant solution is relatively dilute, which reduces its density and causes the float to sink to the bottom of the tank 256. FIG. 8b shows a situation where the desiccant solution is quite concentrated, which increases its density and causes the float to rise to the top of the pool of desiccant liquid. Water evaporates out of any remaining desiccant liquid on the surface of the float and eventually creates a thin layer of salt crystals 257, which helps to reflect solar energy and controls the temperature inside the collector. The action of the float thus provides an automatic shutdown feature that prevents excessive crystallization of the desiccant solution.

The float should be of nearly neutral buoyancy with respect to the desiccant solution, so that the change in solution density is enough determine whether the float rises or sinks. The float materials should be resistant to high temperatures and compatible with the desiccant solution. Foam glass, ceramics, high-temperature plastics, and metals that are compatible with the desiccant are likely choices. The float may be divided into smaller pieces to simplify handling.

The sealed cover has the advantage of keeping ambient moisture out of the desiccant during dark or cloudy periods. A cover without a seal would allow free movement of humid air, which can add undesirable moisture to the desiccant solution.

High-Performance Solar Collector with Electric Back-Up

Figure 9:
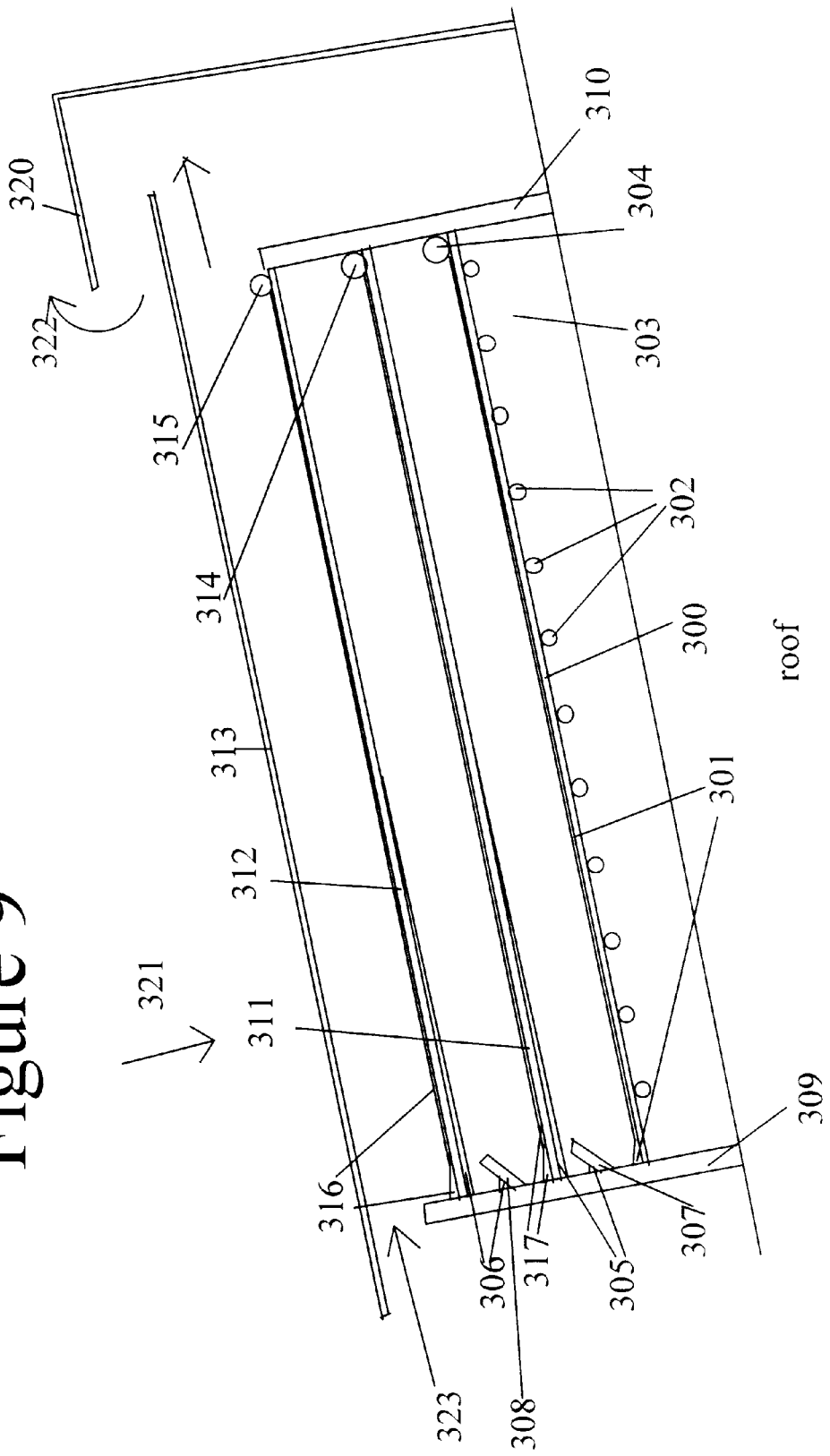

FIG. 9 is a high-performance solar collector with electric backup for use in regenerating the desiccant liquid. This collector provides three stages of regeneration and would operate with peak temperatures of around 200 to 240° F. The three stages of regeneration are arranged so the waste heat from higher-temperature stage drives a lower temperature stage. Desiccant liquid 301 flows from bottom header 304 over collector surface 300. Electric heater elements 302 are located just under the collector surface and provide an auxiliary source of heat. Insulation 303 prevents excessive heat loss through the back of the collector.

The collector has three covers. The bottom cover 311 and middle cover 312 fit tightly with frames 309 and 310 to minimize air leakage. The top cover 313 has large gaps at each end, which allow for air movement under the cover. The bottom and middle covers 311 and 312 are preferably of glass or other heat resistant material. The top cover is preferably made of a tough plastic material to minimize risks of hail damage or other hazards. The top cover experiences much lower temperatures, so heat resistance is not an important issue.

Covers 311, 312, and 313 transmit solar radiation 321 which warms collector surface 300. At night or during cloudy periods, electric heater elements 302 provide an auxiliary heat source for warming the collector surface. The warm temperatures cause moisture in the bottom stream of desiccant liquid 301 to evaporate. The water vapor thus produced is moved by convection and/or diffusion to bottom cover 311 where it condenses to form condensate 305. The condensate flows down the undersurface of bottom cover and collects in a trough formed by catch member 307 and frame 309. The condensate then flows out of the collector and can be used in an evaporative heat exchanger, as distilled drinking water, or discarded. Likewise a portion of the desiccant liquid that collects at the bottom of the collector can be returned to storage and the rest can be recirculated.

The middle stream of desiccant liquid 317 flows from middle header 314 over the top of the bottom cover 311. The heat transmitted to the bottom cover from below evaporates moisture from the middle stream of desiccant liquid 317. The moisture condenses on the bottom surface of the middle cover 312 to form the middle condensate stream 306 which drains through the trough formed by catch piece 308.

The top header 315 supplies the top desiccant liquid stream 316 that flows across the top surface of the middle cover 312. Moisture that evaporates from the top desiccant liquid stream 316 is removed by natural convection of air and does not normally condense on the top cover 313. Entering air 323 flows through the collector and receives the evaporating water vapor. End piece 320 prevents excessive amounts of rain from entering the collector and air leaves the collector as exhaust stream 322.

While this figure shows an electric heater as the backup heating system other heat sources are possible. Hot water, steam, and direct heating with a fuel are also possible. The surface may be heated directly or the desiccant liquid can be heated in a separate heat exchanger. For small systems, a gas water heater may provide the heat source. The selection of the heat source would be determined by fuel cost and availability, installed cost and other factors. If electric power is used it would preferably used at night to take advantage of lower off-peak electric rates.

The optimum collector temperatures depend on the desiccant concentration, the ambient conditions, and other factors. For calcium chloride a minimum temperature difference of about 30° F. is necessary to evaporate a desiccant solution and condense the resulting water vapor. Assuming a temperature difference of about 40° F. in each stage, temperature of the middle cover would be about 120° F., the bottom cover would be 160° F. and the collector surface would be 200° F. If the peak temperature is a problem, a two-stage system can be used instead but with a performance penalty. Of course four or more stages are also possible, but the collector temperature is normally limited to the boiling point of the desiccant liquid which would be roughly 230° F. or somewhat higher.

This collector requires a means for circulating the desiccant liquid. Air-lift pumps or conventional pumps are possible alternatives. The desiccant liquid would normally be recirculated several times through the collector before returning to the storage tank. This recirculation ensures sufficient movement of liquid for adequately wetting the surfaces inside the collector without creating excessive heat loss. A heat exchanger between liquid entering and leaving the collector would further reduce heat losses, but this feature is not required for operation of the system.

The covers need to be tilted by roughly 10 degrees or more to ensure proper drainage of condensate. Smaller angles could result in excessive drainage of condensate back into the desiccant, which would create a large performance penalty.

The actual collector surface can be horizontal, which can allow desiccant to pool inside the collector. This arrangement allows the collector to also function as storage tank. Using a float as a shut-off control as shown earlier would be desirable for this system. This configuration may be especially desirable in tropical areas where the sun's rays are nearly vertical during much of the day.

Preferred Embodiment

Figure 10:
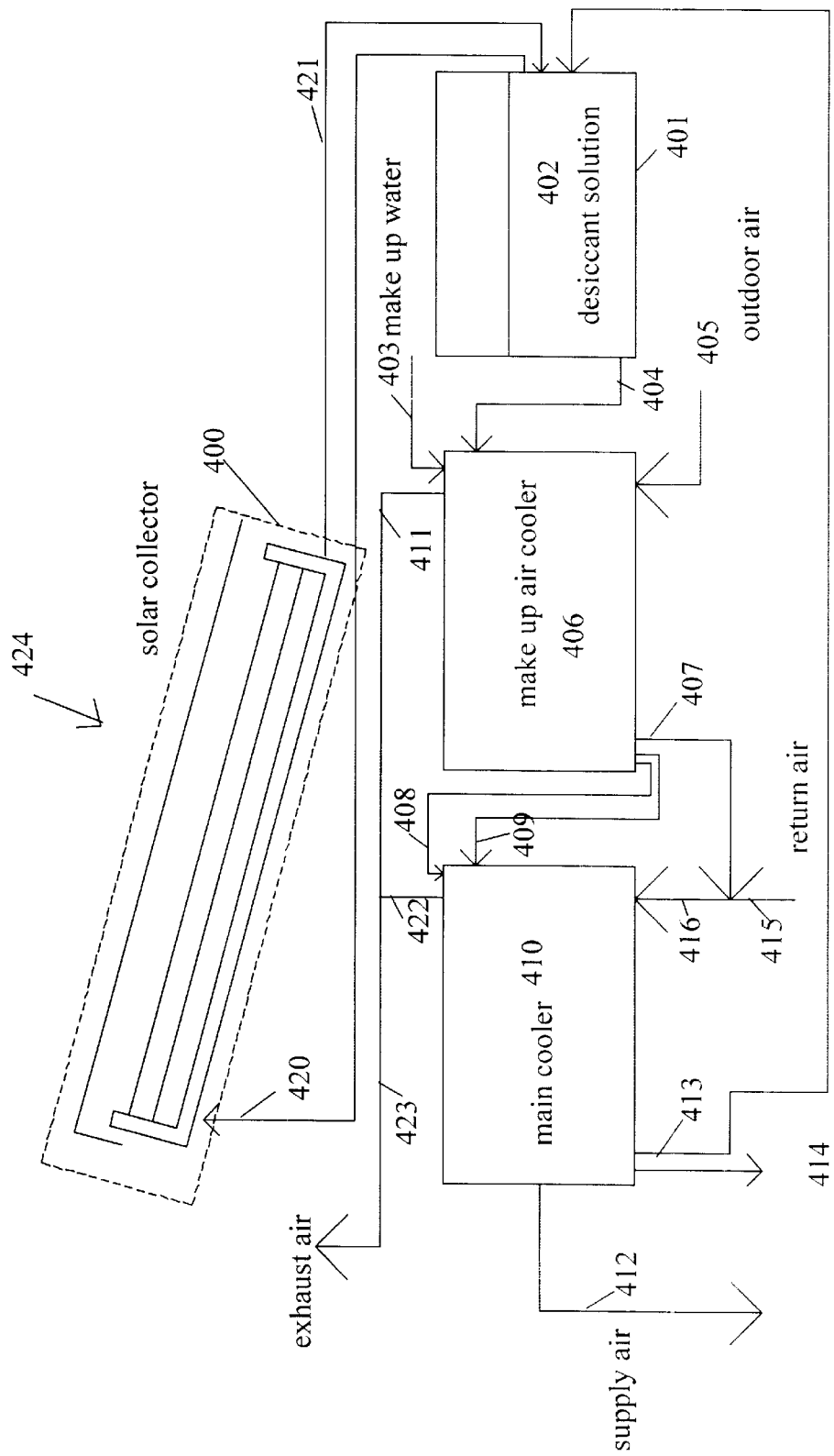
FIG. 10 shows a preferred embodiment of the invention.

FIG. 10 is a schematic drawing of a complete solar air-conditioning system. Solar collector 400 concentrates desiccant solution using heat input from solar radiation 424 or auxiliary heat source as explained in the description of FIGS. 8A and 8B. A tank 401 stores a large quantity of desiccant solution 402. The weak desiccant solution 420 leaves tank 401 and flows through the solar collector 400 and returns as a concentrated desiccant solution 421.

The amount of desiccant solution in the tank depends on the size and efficiency of the system and the length of operation required. A reasonable objective would be to achieve one to three days of storage capability. For a system with a rated capacity of 12,000 Btu/hr system with a 50% duty cycle over two days, corresponds to storage requirement of 288,000 Btu of cooling (24 ton-hours). For a cooling COP of 1 and heat of vaporization of 1000 Btu/lbm mean that this cooling requirement could be met by the ability to absorb 288 lbm of water vapor. For calcium chloride solution with a starting concentration of 50% and an ending concentration of 40% $CaCl_2$ by weight, requires two pounds of calcium chloride to absorb one pound of water. This analysis means that 576 lbm of calcium chloride is required to store the required cooling. For a 40% final concentration, this corresponds to a tank capacity to handle 1440 pounds of solution or about 150 gallons.

The energy storage density per unit volume is almost twice that of ice and requires no special insulation. With proper sealing, the tank can store this cooling capacity indefinitely with essentially zero loss. The cost of calcium chloride is on the order of $.20/lbm so that the cost of the salt for the above example is a little over $100. The cost of storage tank is similar. These costs work out to be roughly $10 per ton-hour, which is roughly 10 to 20% of the cost of conventional ice storage or cold-water storage. This storage system thus has major cost and performance advantages compared to other systems. This inexpensive, compact storage capability combined with simple, efficient solar recharging is a tremendous improvement over the prior art.

Theory of Operation of the Coolers

Figure 11:
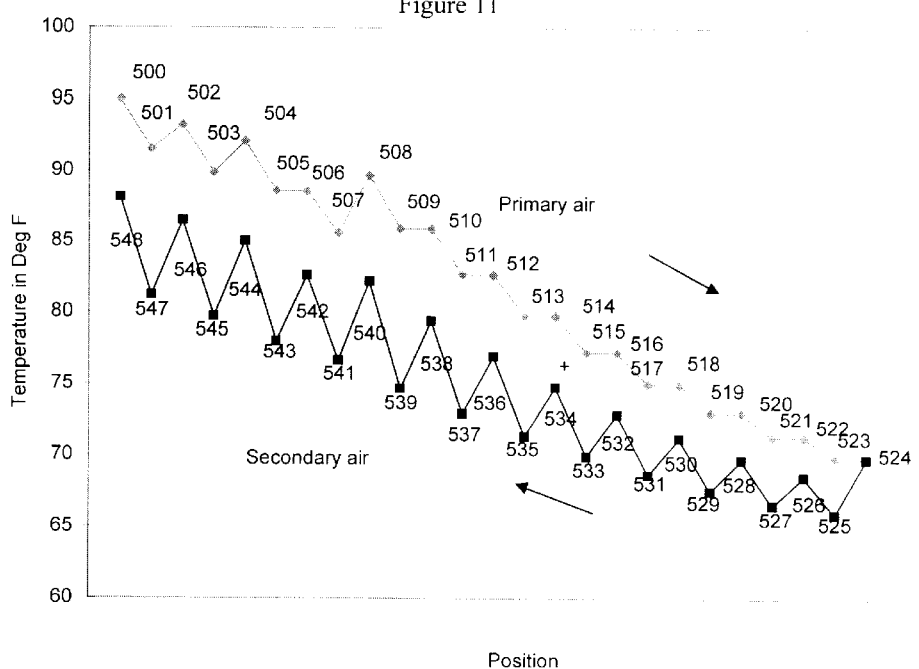
FIGS. 11 and 12 are plots of temperatures through the coolers used in the invention.

FIG. 11 shows how temperatures vary through a system for supplying outside air. The layout of the modeled system is similar to that shown in FIG. 4. This system has 12 stages. Each stage has an air-to-air heat exchanger between primary and secondary, a direct evaporative cooling section on the secondary side, and a desiccant section on the primary side. In this analysis only stages 1, 2, and 4 have active desiccant sections. The mass flow rate on the secondary air stream is approximately half of that of the primary air stream for this analysis. The entering air conditions are 95° F. dry bulb and 75° F. wet-bulb temperature, which is a typical design condition for the eastern US.

The system in FIG. 11 can be used to supply outside air to laboratories or other applications that have a large outside air requirement and limitations on heat recovery or other energy-saving technologies. It has the advantage of conditioning outside air with extremely high efficiency and requires no access to exhaust air. Changes in the details of the design can give different supply-air conditions as required for a particular application.

TABLE 1

Primary Air Stream:

| Location | Temperature (degrees F) | Enthalpy (Btu/lbm) | Stage | Location |
|---|---|---|---|---|
| 500 | 95.0 | 38.6 | 1 | Inlet |
| 501 | 91.6 | 37.8 | 1 | After heat exchanger |
| 502 | 93.3 | 37.8 | 1 | After desiccant |
| 503 | 89.9 | 37.0 | 2 | After heat exchanger |
| 504 | 92.1 | 37.0 | 2 | After desiccant |
| 505 | 88.6 | 36.1 | 3 | After heat exchanger |
| 506 | 88.6 | 36.1 | 3 | After desiccant |
| 507 | 85.6 | 35.4 | 4 | After heat exchanger |
| 508 | 89.7 | 35.4 | 4 | After desiccant |
| 509 | 85.9 | 34.5 | 5 | After heat exchanger |
| 510 | 85.9 | 34.5 | 5 | After desiccant |

TABLE 1-continued

| Location | Temperature (degrees F) | Enthalpy (Btu/lbm) | Stage | Location |
|---|---|---|---|---|
| 511 | 82.6 | 33.7 | 6 | After heat exchanger |
| 512 | 82.6 | 33.7 | 6 | After desiccant |
| 513 | 79.8 | 33.0 | 7 | After heat exchanger |
| 514 | 79.8 | 33.0 | 7 | After desiccant |
| 515 | 77.2 | 32.3 | 8 | After heat exchanger |
| 516 | 77.2 | 32.3 | 8 | After desiccant |
| 517 | 75.0 | 31.8 | 9 | After heat exchanger |
| 518 | 75.0 | 31.8 | 10 | After desiccant |
| 519 | 73.0 | 31.3 | 10 | After heat exchanger |
| 520 | 73.0 | 31.3 | 10 | After desiccant |
| 521 | 71.3 | 30.8 | 11 | After heat exchanger |
| 522 | 71.3 | 30.8 | 11 | After desiccant |
| 523 | 69.9 | 30.5 | 12 | After heat exchanger |
| 524 | 69.9 | 30.5 | 12 | After desiccant (supply air) |

Secondary Air Stream:

| Location | Temperature (degrees F) | Enthalpy (Btu/lbm) | Stage | Location |
|---|---|---|---|---|
| 525 | 88.1 | 45.9 | 12 | After direct evaporative cooler |
| 526 | 81.2 | 44.3 | 12 | After heat exchanger |
| 527 | 86.5 | 44.3 | 11 | After direct evaporative cooler |
| 528 | 79.7 | 42.7 | 11 | After heat exchanger |
| 529 | 85.0 | 42.7 | 10 | After direct evaporative cooler |
| 530 | 78.0 | 41.0 | 10 | After heat exchanger |
| 531 | 82.6 | 41.0 | 9 | After direct evaporative cooler |
| 532 | 76.7 | 39.6 | 9 | After heat exchanger |
| 533 | 82.2 | 39.6 | 8 | After direct evaporative cooler |
| 534 | 74.7 | 37.8 | 8 | After heat exchanger |
| 535 | 79.4 | 37.8 | 7 | After direct evaporative cooler |
| 536 | 72.9 | 36.2 | 7 | After heat exchanger |
| 537 | 77.0 | 36.2 | 6 | After direct evaporative cooler |
| 538 | 71.4 | 34.9 | 6 | After heat exchanger |
| 539 | 74.8 | 34.9 | 5 | After direct evaporative cooler |
| 540 | 69.9 | 33.7 | 5 | After heat exchanger |
| 541 | 72.9 | 33.7 | 4 | After direct evaporative cooler |
| 542 | 68.7 | 32.7 | 4 | After heat exchanger |
| 543 | 71.2 | 32.7 | 3 | After direct evaporative cooler |
| 544 | 67.5 | 31.8 | 3 | After heat exchanger |
| 545 | 69.7 | 31.8 | 2 | After direct evaporative cooler |
| 546 | 66.6 | 31.0 | 2 | After heat exchanger |
| 547 | 68.6 | 31.0 | 1 | After direct evaporative cooler |
| 548 | 66.0 | 30.4 | 1 | After heat exchanger (exhaust) |

TABLE 2

Primary Air Stream:

| Location | Temperature (degrees F) | Enthalpy (Btu/lbm) | Stage | Location |
|---|---|---|---|---|
| 600 | 74.0 | 30.2 | 1 | Inlet |
| 601 | 73.6 | 30.1 | 1 | After heat exchanger |
| 602 | 81.1 | 30.1 | 1 | After desiccant |
| 603 | 78.6 | 29.5 | 2 | After heat exchanger |
| 604 | 80.7 | 29.5 | 2 | After desiccant |
| 605 | 77.9 | 28.8 | 3 | After heat exchanger |
| 606 | 77.9 | 28.8 | 3 | After desiccant |
| 607 | 75.5 | 28.2 | 4 | After heat exchanger |
| 608 | 78.4 | 28.2 | 4 | After desiccant |
| 609 | 75.4 | 27.5 | 5 | After heat exchanger |
| 610 | 75.4 | 27.5 | 5 | After desiccant |
| 611 | 72.6 | 26.9 | 6 | After heat exchanger |
| 612 | 72.6 | 26.9 | 6 | After desiccant |
| 613 | 70.2 | 26.3 | 7 | After heat exchanger |
| 614 | 70.2 | 26.3 | 7 | After desiccant |
| 615 | 68.0 | 25.7 | 8 | After heat exchanger |
| 616 | 68.0 | 25.7 | 8 | After desiccant |
| 617 | 65.9 | 25.2 | 9 | After heat exchanger |
| 618 | 65.9 | 25.2 | 9 | After desiccant |
| 619 | 64.1 | 24.8 | 10 | After heat exchanger |
| 620 | 64.1 | 24.8 | 10 | After desiccant |
| 621 | 62.4 | 24.3 | 11 | After heat exchanger |
| 622 | 62.4 | 24.3 | 11 | After desiccant |
| 623 | 60.9 | 24.0 | 12 | After heat exchanger |
| 624 | 60.9 | 24.0 | 12 | After desiccant (supply air) |

TABLE 2-continued

Secondary Air Stream:

| Location | Temperature (degrees F) | Enthalpy (Btu/lbm) | Stage | Location |
| --- | --- | --- | --- | --- |
| 625 | 73.2 | 36.0 | 12 | After direct evaporative cooler |
| 626 | 72.5 | 35.8 | 12 | After heat exchanger |
| 627 | 76.1 | 35.8 | 11 | After direct evaporative cooler |
| 628 | 71.2 | 34.7 | 11 | After heat exchanger |
| 629 | 75.1 | 34.7 | 10 | After direct evaporative cooler |
| 630 | 69.5 | 33.3 | 10 | After heat exchanger |
| 631 | 73.0 | 33.3 | 9 | After direct evaporative cooler |
| 632 | 68.2 | 32.1 | 9 | After heat exchanger |
| 633 | 72.3 | 32.1 | 8 | After direct evaporative cooler |
| 634 | 66.3 | 30.7 | 8 | After heat exchanger |
| 635 | 69.9 | 30.7 | 7 | After direct evaporative cooler |
| 636 | 64.5 | 29.4 | 7 | After heat exchanger |
| 637 | 67.8 | 29.4 | 6 | After direct evaporative cooler |
| 638 | 62.9 | 28.2 | 6 | After heat exchanger |
| 639 | 65.8 | 28.2 | 5 | After direct evaporative cooler |
| 640 | 61.4 | 27.2 | 5 | After heat exchanger |
| 641 | 63.9 | 27.2 | 4 | After direct evaporative cooler |
| 642 | 60.0 | 26.2 | 4 | After heat exchanger |
| 643 | 62.3 | 26.2 | 3 | After direct evaporative cooler |
| 644 | 58.7 | 25.4 | 3 | After heat exchanger |
| 645 | 60.7 | 25.4 | 2 | After direct evaporative cooler |
| 646 | 57.5 | 24.6 | 2 | After heat exchanger |
| 647 | 59.5 | 24.6 | 1 | After direct evaporative cooler |
| 648 | 56.7 | 23.9 | 1 | After heat exchanger (exhaust) |

Figure 12:
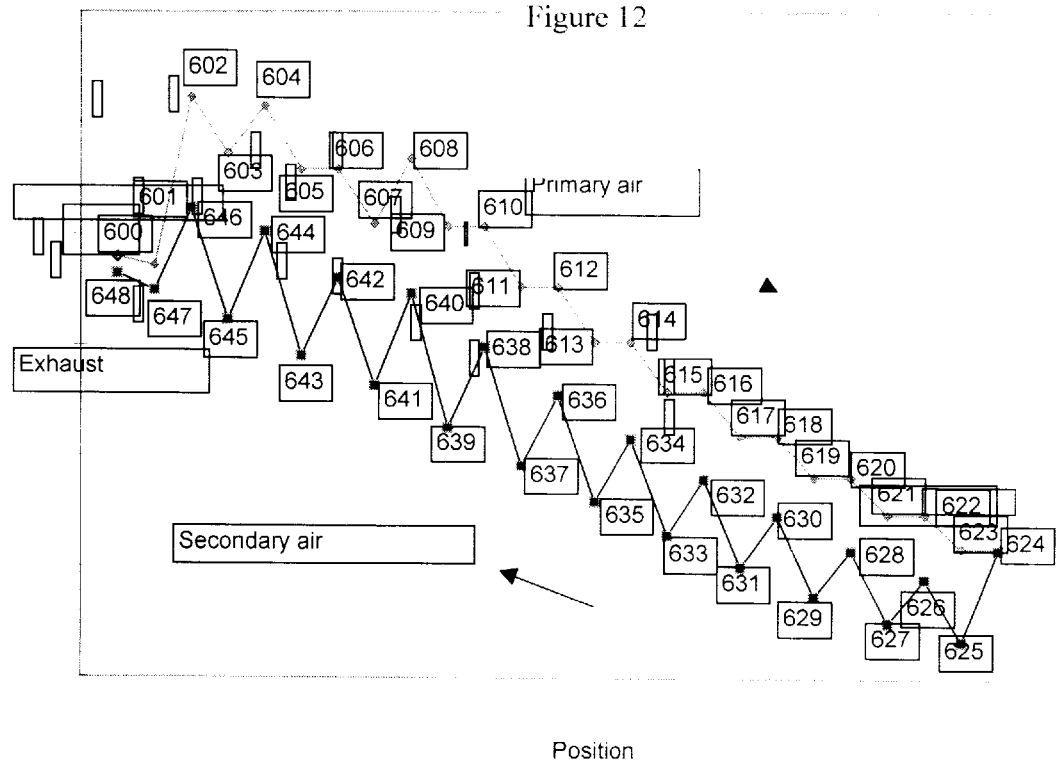

FIG. 12 shows air temperatures for a system for cooling return air. This system is similar to that of FIG. 11 except for the different entering-air conditions. Table 2 describes each location. This system is capable of providing a supply air temperature of 61° F., which is sufficiently low to be compatible with most conventional air-distribution systems. The supply air is at about 75% relative humidity, which is sufficiently low to prevent mold growth in ducts and maintain comfortable space humidity.

These supply-air conditions are illustrative of what is possible with this system. Changes in the details of the design can change the supply air conditions to whatever is required. For example this system is suitable for use in an application which uses a 65 to 70° F. supply air temperature such as is described in my co-pending application entitled "High Efficiency Air Conditioning System with High Volume Air Distribution." Low temperature air is also possible, but with reduced performance.

A complete cooling system is a combination of the system in FIGS. 10 and 11. The system in FIG. 12 exhausts approximately half of the return air. The system in FIG. 11 supplies the make-up air required to replace this exhaust air.

High System Efficiency

The efficiency of these systems is quite high. For these systems the coefficient of performance (COP) is defined as cooling output divided by latent heat absorbed by the desiccant. For the system in FIG. 11, the COP is approximately 2.1. For the combined system including ventilation load the efficiency is about 1.5.

Note that this configuration requires the introduction of outside air. If the basis of comparison is system with no outside air, then there should be no credit for the load associated with cooling the outside air to the building conditions. On this basis the system COP is approximately 0.8.

If the desiccant is recharged using a solar collector, the collector efficiency must be considered. For the three-stage collector shown if FIG. 9, the waste heat from one stage is used to drive the next, which theoretically can triple the output of concentrated desiccant solution. In real life, the collector loss would reduce the effect. Assuming a 50% collector loss, the total system efficiency based on solar input to cooling output can exceed 2.0. This performance is much better than what is possible with expensive absorption chillers with high-performance solar collectors, which gives a system efficiency of 0.2 to 0.5 at best. This efficiency advantage translates into a massive reduction in collector cost and area required to drive the new system compared to the prior art. Even with the use of low-cost collectors such shown in FIG. 7, the new system has a massive efficiency advantage compared with the prior art.

This high performance allows the use electric resistance as a back-up heat source. The efficiency with electric backup should be higher than that for a solar input, since transmission and reflection losses are not a factor. This means that system efficiency in the range of 2 to 3 based on electric input is possible. This efficiency is comparable to that of conventional electric air conditioners. If combined with a suitable storage system, electric back up can take advantage of inexpensive, off-peak electric rates. These rates can be as much as a factor of 10 lower than peak rates. The combination of solar input and off-peak rates can result in a massive reduction in energy cost compared to conventional systems.

Gas Turbine Inlet Cooler

Figure 13:
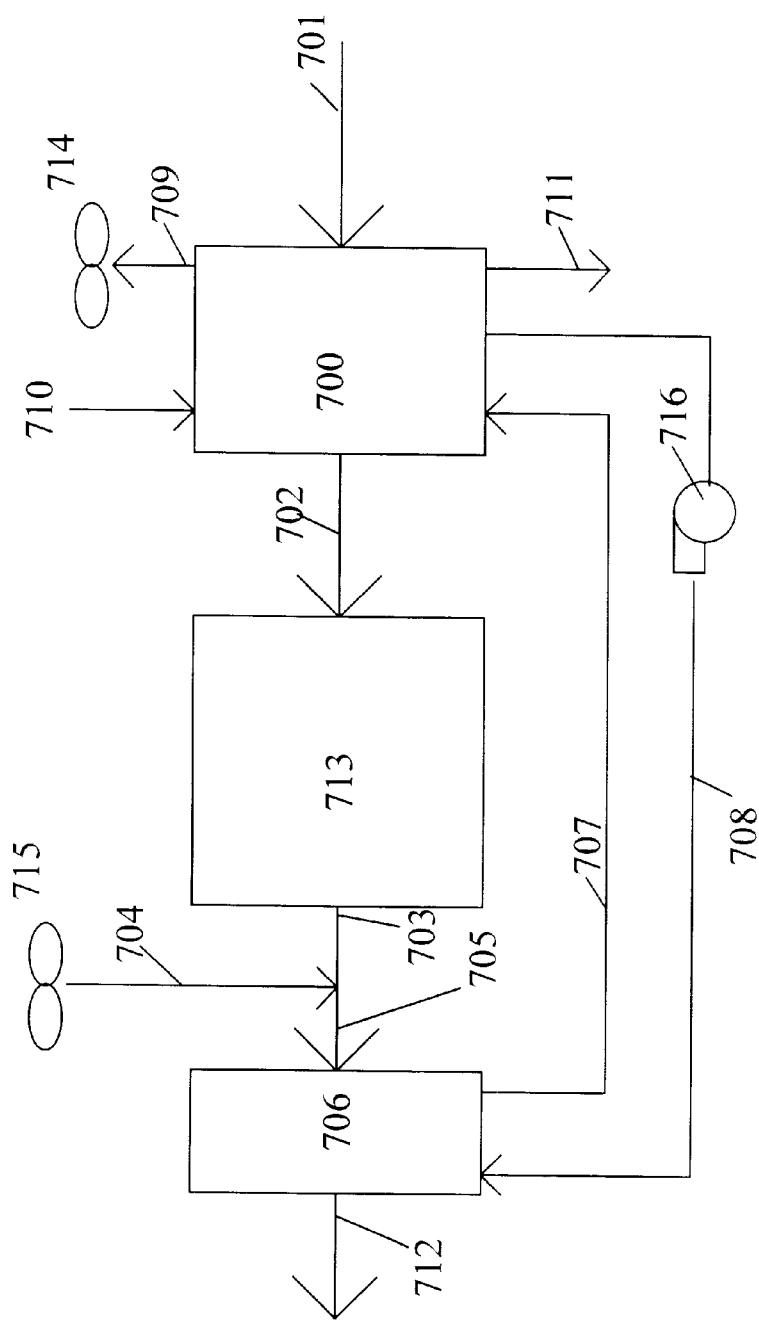
FIG. 13 is an embodiment that can use exhaust heat from a gas turbine for cooling inlet air to the turbine.

FIG. 13 shows a system for cooling inlet air to a gas turbine that uses heat from the turbine for regenerating the desiccant solution. Ambient air 701 enters a regenerative desiccant cooler 700, which cools the air. The cooler includes pumps for circulating water and desiccant solution inside the cooler. The cooler receives make up water 710 and used water 711 drains from the cooler. Exhaust fan 714 draws the exhaust air 709 from the cooler and discharges away from the turbine to prevent recirculation. The turbine inlet air 702 leaves the cooler 700 and enters the gas turbine 713. Fan 715 adds ambient air 704 to the turbine exhaust air 703 to form mixed air 705. The mixed air 705 enters regenerator 706 where it evaporates water from the desiccant solution. The regenerator comprises an extended surface that is wetted with desiccant liquid. It may be made of materials similar to that used in direct evaporative coolers. Mixing ambient air with turbine exhaust lowers the temperature of air entering the regenerator, which allows the use of inexpensive low-temperature materials. Pump 716 moves diluted desiccant solution 708 from the cooler 700 to the regenerator 706. The regenerator can include a pump or circulating desiccant liquid inside the regenerator. Concentrated desiccant 707 returns to the cooler from the regenerator. Outlet air 712 exits from the regenerator.

This system can increase turbine output power by roughly 20 percent at summer peak conditions. The capacity gas turbine declines by about 0.4 percent per degree Fahrenheit. A 20% improvement in capacity corresponds to cooling the inlet temperature is reduced from 100 to 50° F. at peak conditions. The system can also control relative humidity to the turbine. Turbine efficiency improves by roughly 0.1%/°F. which corresponds to as much as 5% improvement at peak conditions. Input power for fans and pumps needed to operate the desiccant system is small and should not significantly effect these figures.

Heat-Exchanger Details

Figure 14A:
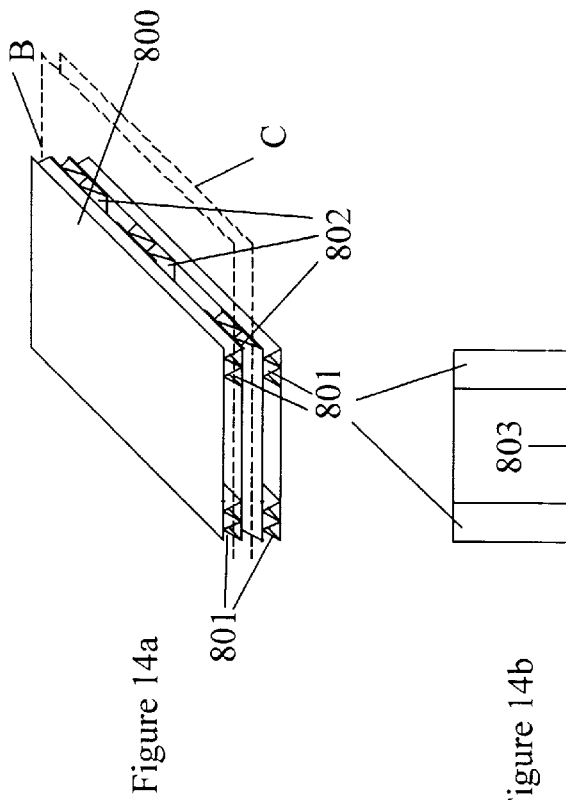
FIGS. 14a, 14b, and 14c show details of heat exchanger design that may be used in the invention.
Figure 14B:
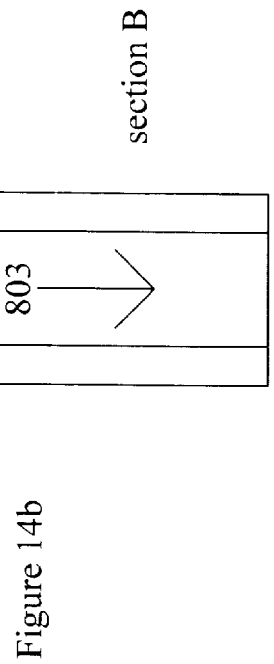
Figure 14C:
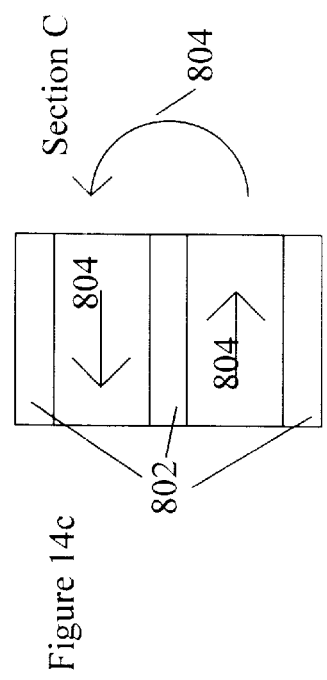

FIGS. 14a, 14b, and 14c show an alternate gas-to-gas heat exchanger design using paper and cardboard. Sheets of paper 800 are supported between first spacers 801 and second spacers 802. The spacers are preferably made of corrugated cardboard or similar material. As shown in FIG. 14*b*, first spacers 801 are oriented to allow primary air stream 803 to flow the length of the paper in a single pass. Second spacers 802 are set to form multiple passes of secondary air stream 804. The whole heat exchanger is coated with a material such as linseed oil, acrylic, wax, etc. which serves as both an adhesive and a protective coating. While this drawing shows a two-pass arrangement on the secondary side, similar geometries can accommodate any number of passes. This heat exchanger construction has many applications including exhaust-air heat recovery in addition to use in evaporative and desiccant systems.

Dehumidifer Embodiment

Figure 15:
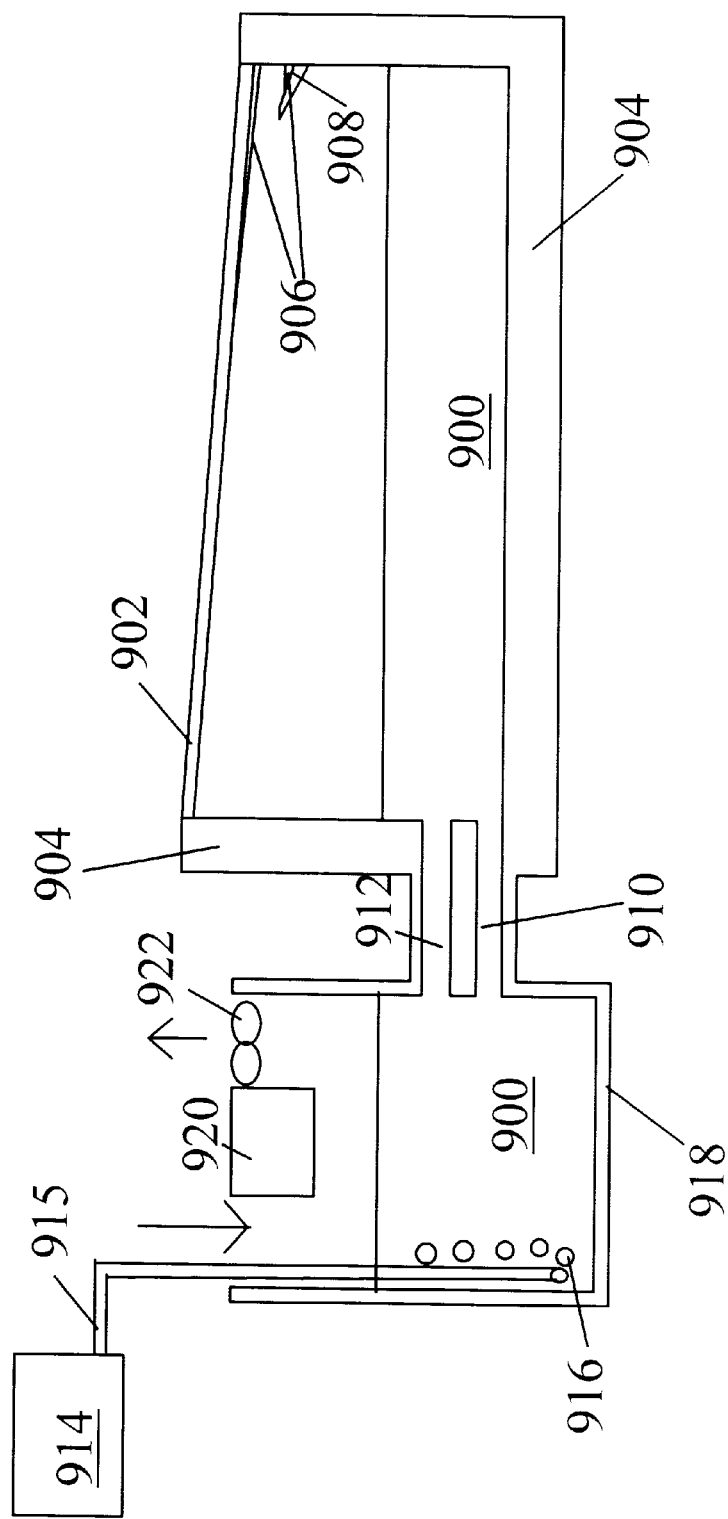
FIG. 15 shows another preferred embodiment that is suitable for use as a dehumidifier.

FIG. 15 shows another preferred embodiment that is acts as a dehumidifier. Desiccant fluid 900 is contained in an insulated container 904 and is heated by solar radiation that is transmitted through a cover 902. Moisture evaporates from the fluid and forms condensate 906 on the bottom side of the cover. The condensate flows down the underside of the cover and collects in a channel 908. The desiccant fluid moves by natural convection through channels 910 and 912 to a tank 918. An air pump 914 blows air through a tube 915 into the desiccant fluid 900 forming bubbles 916. The flow of air mixes the desiccant liquid in the tank. A fan 922 draws air over the desiccant fluid, which dehumidifies the air stream. A baffle 920 directs the air to toward the surface of the liquid. The baffle also acts to cut off air flow if the liquid level gets too high, thus preventing and overflow of desiccant liquid. A level switch may also be included to turn off the air pump and fan at high liquid levels.

This embodiment may be useful as a small dehumidification system that can fit in a window. It may be especially useful for bathrooms or basements in homes.

Overall this invention has many advantages over the prior art:

1) Simple, low-cost, reliable designs
2) Counter cross flow configuration reduces cost an achieves good performance
3) Evaporative system with the ability to approach the dewpoint temperature
4) Desiccant system can act as a heat pump to raise supply air temperatures
5) Ability to use low-cost, safe, desiccants such as calcium chloride for air-conditioning
6) Compact energy, inexpensive, low-cost, energy-storage capability in the form of a concentrated desiccant solution
7) Low-cost solar regeneration
8) Ability to use off-peak electricity for back-up to solar
9) Ability to separate the wet portions of the system so as to allow easy replacement
10) Use of reliable, low-cost air-lift pumps which allow the use of many different liquid circuits
11) Extremely high efficiency possible
12) Simple controls
13) Ability to use readily available components
14) Low-cost paper-based heat exchangers

What is claimed is:

1. A solar air conditioner comprising,
    a. a solar collector that comprises a collector surface that is oriented to receive thermal energy from the sun and a means for spreading desiccant fluid over said collector surface so that said solar radiation warms said desiccant fluid and evaporates water from it,
    b. a mass-transfer device that transfers moisture from a primary air stream to said desiccant fluid,
    c. cooling means that is in contact with said primary air stream and that is capable of cooling said primary air stream to a temperature that is lower than the ambient wet-bulb temperature, and
    d. a fluid circuit that includes said mass transfer device and said solar collector so that moisture moves from said primary air stream into said desiccant fluid in said mass-transfer device; desiccant fluid moves from said mass transfer device to said solar collector which uses solar energy to evaporate water from the desiccant fluid; and concentrated desiccant fluid returns to said mass-transfer device; and said cooling means lowers the temperature of said primary air stream so as to cool and dehumidify said primary air stream.

2. The solar air conditioner of claim 1 further comprising a secondary air stream and wherein said cooling means comprises:
    a. a heat-exchange device that transfers thermal energy from said primary air stream to said secondary air stream and
    b. means for evaporating water into said secondary air stream before it exits said heat-exchange device so as to cool the secondary air stream and thereby reduce the temperature of said primary air stream.

3. The solar air conditioner of claim 2 wherein said secondary air stream is drawn from air that has been previously conditioned by said solar air conditioner.

4. The solar air conditioner of claim 3 wherein said primary air stream is drawn from the ambient air.

5. The solar air conditioner of claim 4 wherein said secondary air stream is exhausted to the ambient after passing through said heat exchanger.

6. The solar air conditioner of claim 5 wherein said heat-exchange device comprises at least two stages that are arranged in an approximately counterflow configuration so that a first stage removes thermal energy from primary air before it enters a second stage and adds thermal energy to said secondary air after it exits said second stage.

7. The solar air conditioner of claim 6 wherein said mass-transfer device comprises at least two stages that are configured so that at least one stage of said heat-exchange device removes thermal energy from said primary air stream after it enters said first a first stage of said mass-transfer device and before said air stream enters a second stage of said mass-transfer device.

8. The solar air conditioner of claim 7 wherein said at least one stage of said heat-exchange device transfers thermal energy from said primary air stream before it enters said first stage of said mass-transfer device.

9. The solar air conditioner of claim 1 further comprising an auxiliary source of thermal energy that heats said desiccant liquid so that water vapor may evaporate from said desiccant liquid when solar energy is insufficient.

10. The solar air conditioner of claim 9 wherein said auxiliary source of thermal energy comprises an electric heater that is connected by a thermally conductive pathway to said collector surface so as to heat desiccant fluid flowing over said collector surface.

11. The solar air conditioner of claim 9 further comprising a channel carrying a hot fluid that is connected by a thermally conductive pathway to said collector surface as to heat desiccant fluid flowing over said collector surface.

12. The solar air conditioner of claim 1 wherein said means for spreading desiccant fluid over said collector surface comprises means for trickling said desiccant fluid over said collector surface.

13. The solar air conditioner of claim 1 wherein said means for spreading desiccant fluid over said collector surface comprises means for pooling said desiccant fluid over said collector surface.

14. The solar air conditioner of claim 1 wherein said solar collector further comprises a first light-transmissive cover that can transmit solar radiation located above said collector surface so as to prevent precipitation from the atmosphere from diluting said desiccant fluid.

15. The solar air conditioner of claim 14 wherein said solar collector further comprises a first enclosure that is bounded at the top by said first light-transmissive cover and at the bottom by said collector surface so as to prevent movement of gas between said enclosure and the ambient and wherein said first light-transmissive cover is oriented at an angle with respect to horizontal so as to allow water that condenses on the bottom surface of the light-transmissive cover to drain without dripping onto the collector surface.

16. The solar air conditioner of claim 15 further comprising a second light-transmissive cover located over said first light-transmissive cover and comprising means for trickling desiccant fluid over the surface of said first light-transmissive cover so that heat transmitted through said first light-transmissive cover evaporates water from said desiccant fluid flowing over the first light-transmissive cover.

17. The solar air conditioner of claim 16 wherein said second light-transmissive cover is oriented at an angle with horizontal to allow water that condenses on the bottom surface of the second light-transmissive cover to drain without dripping into the desiccant fluid and further comprising:
   a. a third light-transmissive cover located over said second light-transmissive cover,
   b. means for trickling desiccant fluid over said the surface of said first second light-transmissive cover, and
   c. a second enclosure that is bounded at the top by said second light-transmissive cover and at the bottom by said first light-transmissive cover so that heat transmitted through the second light-transmissive cover evaporates water the desiccant fluid flowing over the second light-transmissive cover.

18. The solar air conditioner of claim 1 further comprising means for storing concentrated desiccant fluid sufficient for several hours of operation of the air conditioner.

19. The solar air conditioner of claim 1 wherein desiccant fluid moves through said fluid circuit by natural convection.

20. The solar air conditioner of claim 1 wherein said fluid circuit further comprises a pump for circulating desiccant fluid.

21. The solar air conditioner of claim 20 wherein said pump is an air-lift pump.

22. A heat-exchange device comprising:
   a. a first heat exchanger for transferring thermal energy between a two gas streams,
   b. a primary gas stream which flows through a first side of said heat exchanger,
   c. a secondary gas stream which flows through multiple passes on a second side of said heat exchanger in an approximately counterflow configuration with respect to said primary gas stream and which comprises a first portion of said primary gas stream that exits said heat exchanger,
   d. a supply gas stream that comprises a second portion of said primary gas stream that exits said heat exchanger,
   e. a first fluid, and
   f. a mass transfer means between said first fluid and said secondary gas stream whereby evaporation of said first fluid into said secondary gas stream lowers the temperature of said secondary gas stream, which allows thermal energy to move from said primary air stream to said secondary air stream through said heat exchanger and thereby reduce the temperature of the supply gas stream.

23. The heat exchange device of claim 22 wherein said first fluid is water.

24. The heat exchange device of claim 23 wherein said mass-transfer means comprises evaporative media that are in located between said passes of secondary air so that secondary air is alternately cooled by evaporating water from said evaporative media and warmed by the primary gas stream in a pass of said heat exchanger.

25. The heat exchange device of claim 24 further comprising a desiccant located in contact with the primary air stream.

26. The heat exchange device of claim 25 wherein said desiccant is a liquid desiccant and wets a mass-transfer surface.

27. An air conditioner that is capable of storing sensible and latent cooling comprising:
   a. a primary air stream,
   b. a secondary air stream that comprises air that was previously cooled by said air conditioner,
   c. a desiccant fluid,
   d. means for storing a quantity of desiccant fluid sufficient for several hours of operation,
   e. a regenerator that heats said desiccant fluid so as to evaporate water from said desiccant fluid,
   f. a mass-transfer device,
   g. a fluid circuit formed by said storage tank and said mass transfer device and said regenerator,
   h. a heat-exchange device that transfers thermal energy from said primary air stream to said secondary air stream,
   i. and means for evaporating water into said secondary air stream before it exits said heat-exchange device so as to cool the secondary air stream.

28. The device of claim 27 wherein said desiccant fluid comprises an aqueous solution of calcium chloride.

29. The device of claim 27 wherein heat for said regenerator is provided by off-peak electricity.

30. The device of claim 27 wherein heat for said regenerator is provided by solar energy.

* * * * *